April 4, 1939.　　A. L. HOLVEN ET AL　　2,152,645
PHOTOELECTRIC COLOR MEASURING AND ANALYZING APPARATUS
Filed Dec. 19, 1934　　2 Sheets-Sheet 1

INVENTORS
Alfred L. Holven
Thomas R. Gillett

April 4, 1939. A. L. HOLVEN ET AL 2,152,645
PHOTOELECTRIC COLOR MEASURING AND ANALYZING APPARATUS
Filed Dec. 19, 1934 2 Sheets-Sheet 2
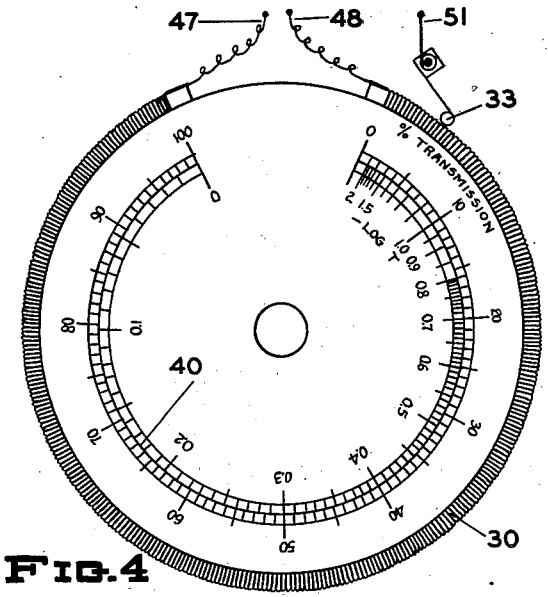
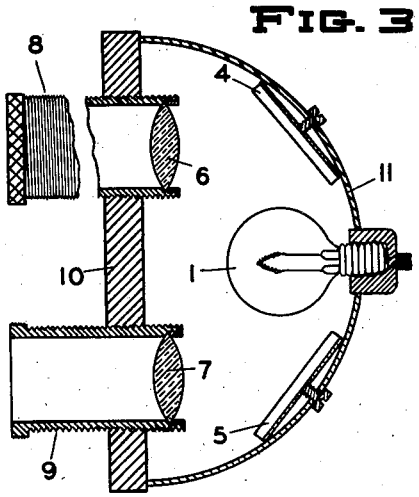
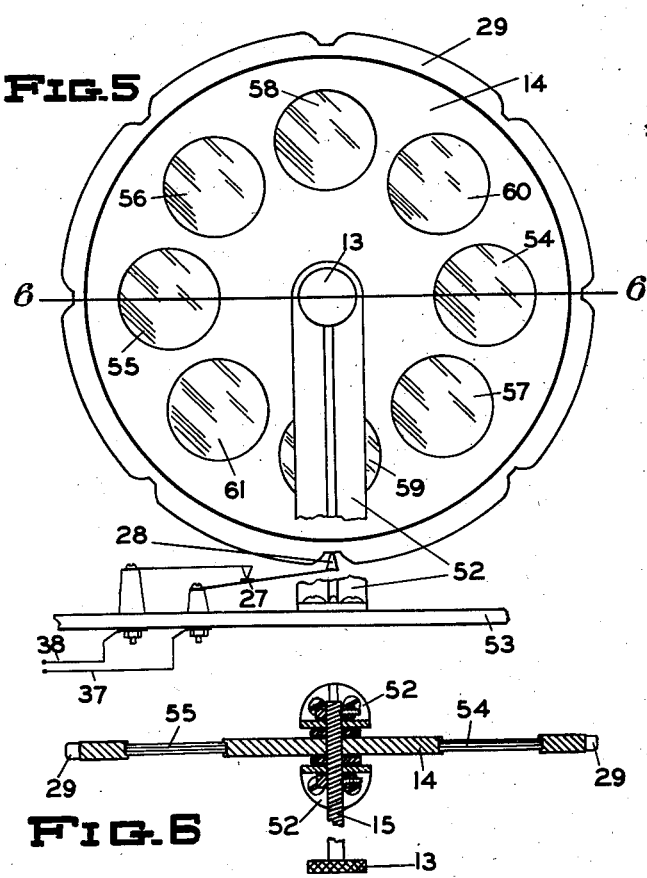
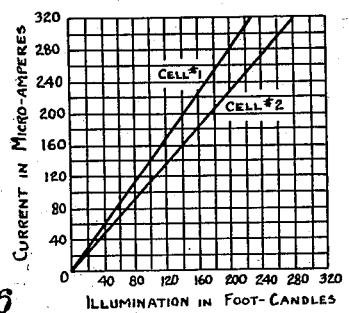
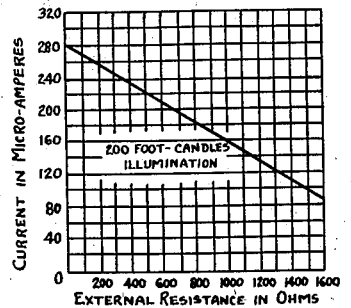
INVENTORS
Alfred L. Holven
Thomas R. Gillett Patented Apr. 4, 1939

2,152,645

UNITED STATES PATENT OFFICE 2,152,645

PHOTOELECTRIC COLOR MEASURING AND ANALYZING APPARATUS

Alfred L. Holven and Thomas R. Gillett, Crockett, Calif.

Application December 19, 1934, Serial No. 758,342

8 Claims. (Cl. 88—14)

Our invention relates to an improved type of color measuring and analyzing apparatus in which the objective is achieved by photo-electric rather than visual means.

It is frequently necessary to measure the color of transparent or translucent materials either in terms of absolute absorption values at one or more points of the spectrum, or in terms of arbitrary units such as those given by either the Stammer scale or the N. P. A. scale. Heretofore, there has been no simple device available for accurately determining either the magnitude or the composition of a color. Devices based on visual methods have been subject to the personal errors inherent in the observer, while photo-electric methods in general have been subject to errors attributable to inequalities in the sensitivities of photo-electric cells, fluctuations in potentials involved in the circuit, variations in the intensity of the illumination, as well as lack of a strictly fundamental and linear relationship between true color and the actual readings of the instrument.

The present invention eliminates the principal errors associated with previous instruments by opposing, in a compensating electrical circuit whose degree of unbalance objectively furnishes a direct measure of the color in absolute units, the direct and unamplified output of two light-sensitive devices which initially have been adjusted to perfect equality of response.

It is the object of the present invention to achieve by photo-electric means a measure of the composition of color of transparent and translucent materials without recourse to the usual mechanical arrangements such as calibrated adjustable shutters or movable illuminators, or electrical arrangements involving the use of amplifiers, batteries, indicating instruments and the like, any of which may influence the accuracy of the measurement.

Another object of this invention is to combine the photo-sensitive devices in a circuit of such type that the desired measurement will be indicated directly in terms of the unit or quantity to be measured, as for example, the appropriate units for expressing light transmittancy, density, or absorbing qualities of a substance, without the necessity of either calculating the measurement or empirically calibrating the instrument.

Another object of our invention is to provide optical rather than electrical or mechanical means of precisely compensating for inequalities in the response of the light-sensitive devices employed, in order that their reactions to the conditions involved will be identical in all respects.

It is a further object of the invention to furnish a measurement whose accuracy is unaffected by fluctuations in the intensity of illumination.

It is also an object of the invention to provide means by which a measure of coloring power of the solute present in a solution can be directly achieved by means of a single measurement.

Other objects will appear from the disclosure which will follow.

This invention embodies improved means and a novel combination of equipment for achieving the objects enumerated above. In the form shown, the operation of this invention involves the use of two light-sensitive cells of the current-generative type, an optical means of compensating for unequal sensitivities in the current-generative cells, and a balanced circuit particularly adapted to current-generative cells, but differing from that customarily employed in devices wherein cells of the photo-emissive or photo-conductive types have been used. The advantages of the circuit employed and of the particular combination of elements used will be evident in that part of the application which follows. Furthermore, it will be obvious as our invention is set forth that it will appear broadly applicable to a large number of uses.

Certain novel features which we believe to be particularly characteristic of our invention are: a circuit in which there is no variable factor involved in the photo-electric circuits proper, and in which the measurable magnitude of a resistance is directly proportional to the light transmissive properties of the sample being tested; an optical means of precisely compensating for inequalities in response of the cells employed; a unique arrangement for furnishing any one of a number of bands of monochromatic light to the cells; means of assuring perfect alignment of such filters in the paths of light; and means of avoiding errors introduced by the fatigue properties of light-sensitive devices of the current-generative type; all of which will be later described and set forth in particular in the appended claims. For a better understanding of our invention, however, as to its organization and method of operation, reference should be made to the accompanying drawings wherein we have shown by way of illustration and not of limitation one type of apparatus for carrying out our invention.

In the drawings wherein like numerals refer to like parts throughout the several views:

Fig. 3 is a detailed view of the illuminator and optical compensator.

Fig. 4 is a detailed view of the face of the indicating dial and the slide wire with which it is associated.

Fig. 5 is a detailed face view of the color filter disc and the electrical contacting switch associated therewith.

Fig. 6 is a cross-sectional view of the color filter disc shown in Fig. 5 taken through center line 6—6.

Fig. 7 is a graph showing the output in current of two current-generating light-sensitive devices under the influence of various intensities of illumination.

Fig. 8 is a graph showing the effect of external resistance on the output of the current-generating type of light-sensitive cell.

Figure 1:
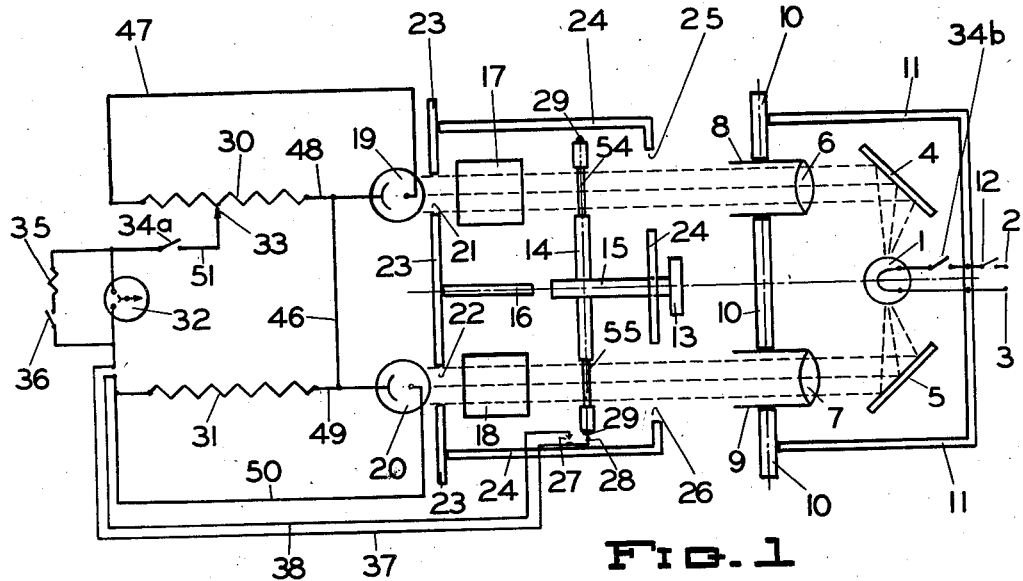
Fig. 1 is a schematic diagram illustrating a specific embodiment of our invention.
Figure 2:
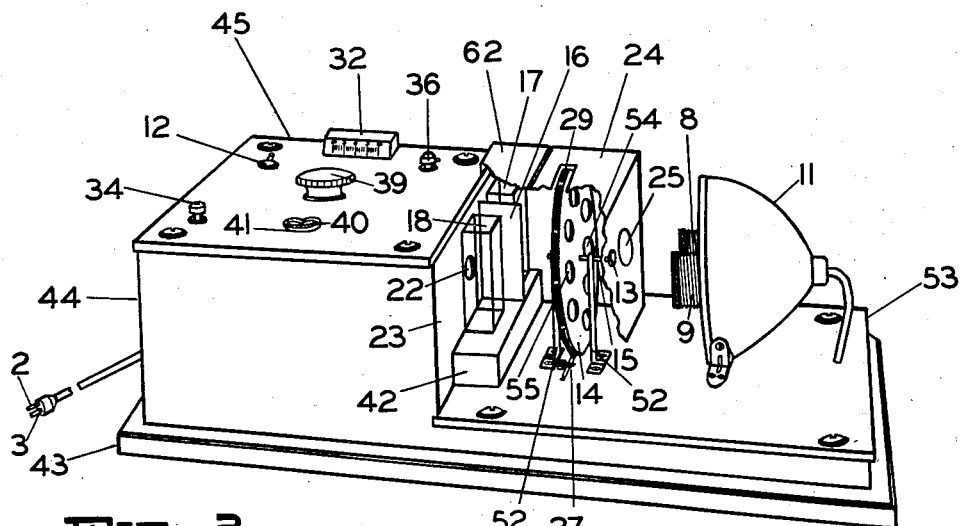
Fig. 2 is a perspective view of the exterior of an apparatus representative of this invention.

Referring to Figs. 1 and 2, at 1 is shown a single fixed source of illumination operated from an energizing source connected at 2 and 3. Immediately adjacent on either side of the illuminator are disposed reflectors 4 and 5 which direct two separated beams of light through adjustable lenses 6 and 7, color filters 54 and 55, absorption vessels 17 and 18, and fixed apertures 21 and 22 onto the faces of two light-sensitive cells 19 and 20. Referring particularly to the balancing circuit, the two light-sensitive cells 19 and 20 are of the current-generative type requiring no external source of potential. The two cells, 19 and 20, are respectively shunted by the fixed resistances 30 and 31 by means of connecting arms 47 and 48, and 49 and 50, respectively. These elements are connected in a potentiometer type circuit in which like poles are connected opposingly by means of connecting arms 46 and 51. Arrangement of the components of these circuits in the manner shown causes the potentials developed by passage of the photo-electric currents through shunt resistances 30 and 31 to be in opposition. In connecting arm 51 is inserted a galvanometer 32. We find it convenient to use a low resistance galvanometer of the lamp and scale variety which tends to give a maximum sensitivity to the present invention. For the fixed resistance 31, shunting cell 20, we prefer a precision enclosed wire wound resistance, while for the fixed resistance 30, shunting cell 19, we prefer a circular slide wire resistance. The connection from the galvanometer 32 to the resistance 30 is made through the movable contact 33.

The use of the particular type of circuit described above involves distinct novelty. It will be noted that both cells are shunted by fixed resistances in permanently closed circuits in which neither variable contacts nor variable resistances are used. Furthermore, by potentiometrically opposing the potentials developed across the shunting resistances in these closed cell circuits, as previously discussed, a direct measure of transmission is obtained with the movement of a single contact in the galvanometer circuit. It is obvious, therefore, that this circuit differs considerably from types of circuits employed in color measuring apparatus using amplifiers which may introduce errors through changes in the straight line response of the cells or circuits in which batteries necessitate extensive adjustments of potentials to gain proper balancing of the circuit. The type of circuit employed in the present invention involves no external variables and requires no initial electrical adjustments or calibrations.

Referring again to Figs. 1 and 2, the receptacles 17 and 18, which contain the materials whose absorptive or transmissive properties are to be compared, are shown mounted on a rack 42 which may or may not be adjustable. While absorption cells may assume a variety of forms, we have found it desirable to use rectangular glass vessels having optically plane sides. A light shield 16 is inserted between vessels 17 and 18 to prevent inter-reflection of light between the glass vessels to the two light-sensitive cells.

In order to prevent extraneous light from reaching the cells and affecting the accuracy of the measurements, a small housing 24 having a hinged top 62 is used to cover the absorption vessels and filter disc and protect the cells from interfering light. This housing has two apertures 25 and 26 in line with the light beams, allowing only the intended light to reach the cells. This features enables the instrument to be used in daylight, thus eliminating the necessity of a dark room or similar enclosure in which to make color determinations.

All of these various components as herein described are mounted in proper relation to each other on the base 43 and the paneling 23, 45, and 53 and within the cabinet proper 44 as shown in Fig. 2.

In actual construction of our invention, we have made several additions to our basic circuit. For example, to protect the galvanometer from excessive vibration when not in use, it may be shunted by a low resistance 35 in series with a suitable switch 36 as indicated. In addition, a switch 12 may be used to disconnect the illuminator from the energizing source of voltage connected at 2 and 3.

These particular devices, however, are not essential to the operation of the invention and may be either dispensed with or replaced by other devices of a similar nature. Likewise, additional devices which appear desirable may be used without affecting the basic circuit employed and without departing from the spirit or scope of the invention.

As previously mentioned, both light-sensitive devices are illuminated by the single fixed source of illumination 1, which is both equidistantly and symmetrically disposed with respect to both light-sensitive devices, thereby bringing about a condition in which both light-sensitive devices are equally affected by variations in the intensity of the source of illumination. In this connection, owing to the inherent property of light-sensitive devices of the current-generative type to decrease in current output when continually illuminated, it is desirable to incorporate means of avoiding errors attributable to such fatigue of the cells. In most prior instruments of a similar nature, however, such errors have either been disregarded or unrecognized.

Fig. 3 illustrates a detailed cross-sectional view through the center plane of the illuminator and the novel optical means of compensating for the inequalities often present in photo-sensitive devices. Two mirrors 4 and 5, arranged substantially as shown, reflect parallel beams of light through the lenses 6 and 7. These lenses are mounted in receptacles 8 and 9 movable along the axis of the light beam transmitted by the lens. The receptacles in which these lenses are mounted are equipped with suitable means of effecting a precise adjustment of the position of the lens along the aforesaid axis. In this case, such means consists of the exterior of the receptacles 8 and 9 being helically threaded to engage with corresponding helical threads in the apertures in the plate 10 in which the receptacles are mounted, thereby permitting these lenses to be moved forward or backward with respect to the reflectors 4 and 5 by merely imparting the appropriate rotary motion to the receptacles. The entire illumination arrangement is enclosed by the housing 11. Adjustment of the position of these lenses by the means disclosed offers a novel means of effecting a precise regulation of the relative intensities of the emergent beams to such a ratio as may be required to bring about an equal response from both photo-sensitive devices, irrespective of any differences which may have existed in their original sensitivities as measured by their relative response to equal illuminations. It is believed that such a method of optically compensating for differences in cell response as above described is both novel as well as superior to other methods employed in which additional resistances are inserted in the measuring circuit.

Fig. 4 is a face view of the indicating dial 40 and the slide wire 30 with which it is associated. The photo-electric circuit herein disclosed lends itself particularly well to the measurement of transmission and color, as the percentage of the total slide wire resistance required in the galvanometer circuit to effect a null point reading of the galvanometer is mathematically equivalent to the percentage transmission of the sample being measured. For similar reasons, the color in absolute absorption units is equal to the minus logarithm of the percentage of the total slide wire resistance required to balance the galvanometer. In a circuit of this particular type, it is therefore possible to engrave both the "percentage transmission scale" and the "color in absolute absorption units scale" on the indicating dial without making a preliminary calibration of the instrument. This dial may also be equipped with secondary scales such as the Stammer scale or the N. P. A. scale. The value of this novel feature of direct reading scales is obvious as it eliminates the necessity of the extra calculations required with most types of colorimeters in order to obtain transmissions or color values.

Figs. 5 and 6 illustrate one particular arrangement of color filters which provides for trichromatic analysis of any particular sample involved. These filters, whose purpose it is to simultaneously furnish both light-sensitive cells with light of identical characteristics, may consist of any material which is transparent to only a selected spectral band. In the illustrated arrangement, color analysis is provided for in the red, green, and violet portions of the spectrum. Direct transmission measurements without the use of a filter may also be made.

In addition to the color filter disc 14 shown, a second disc may be provided to furnish a more complete color analysis of a sample by the use of a greater number of filters of narrower spectral bands. We have found it possible to prepare substantially monochromatic color filters by superimposing two gelatine film filters, one of said filters being absorptive for all wave lengths above the upper limit of the desired spectral transmission band while the other of said filters absorbs all wave lengths below the lower limit of the desired spectral transmission band. By such means it has been possible to assemble a series of monochromatic color filters covering in frequent intervals the entire visible spectrum.

As further illustrated in Figs. 5 and 6, the series of such filters 54, 55, 56, 57, 58, 59, 60, and 61 may be mounted in a disc 14, rotated on shaft 15 by means of knob 13, and supported by members 52. In this arrangement, the two filters which are disposed on the same diameter, for example, filters 54 and 55, are of identical light transmitting characteristics. By rotation of the color filter disc, successive monochromatic spectral bands of identical characteristics may be simultaneously transmitted onto each of the two light-sensitive cells 19 and 20. A further innovation is the use of labels indicating which filter is disposed in the path of the light beams and its maximum wave length in millimicrons.

Fig. 5 also shows, associated with the color filter disc 14, a novel means of rendering the instrument inoperative (as a precautionary measure) when the filters are not in perfect alignment with the lenses 6 and 7 and the light-sensitive cells 19 and 20. In this arrangement, such means consists of a series of peripherally arranged cams 29 which operate an electrical contact switch 27 by means of wedge 28, said switch, being in either the illuminating circuit or the galvanometer circuit or both, opening the circuit whenever pairs of monochromatic spectral band filters are not perfectly aligned with respect to the lenses 6 and 7 and the light-sensitive cells 19 and 20. One method of connecting the contacts 27 in the galvanometer circuit by means of connecting wires 37 and 38 may be noted by referring back to Fig. 1.

Fig. 7 is a graph showing how the current outputs of two typical light-sensitive cells of the current-generative type may differ, and is for the purpose of illustrating the necessity of compensating for such inequalities of response in a manner which will be later described.

Similarly Fig. 8 is a graph showing the effect of external resistance on the current output of a light-sensitive cell of the current-generative type at a given fixed intensity of illumination, and is illustrative of the advantages of optical means of compensating for the differences in current output shown in Fig. 7 over certain electrical means as will hereinafter be referred to.

In considering the basic principles involved in the operation of this instrument, assume that both light-sensitive cells are identical in response. If light of equal intensity reaches both cells, causing equal responses by the cells, the potential differences across the two resistances 30 and 31 are exactly equal but opposed in direction and therefore no current will flow in the galvanometer circuit as indicated by galvanometer 32. If, however, both cells are not perfectly equal in response, which is the case generally found in most pairs of cells, the novel means of optically compensating for such differences by adjustment of the relative position of lenses 6 and 7 to bring about equal responses of the cells is employed as described elsewhere in this application.

Now, assume that the light reaching cell 20 has been decreased by filling absorption vessel 18, located in front of cell 20, with a colored sample. The current now generated by cell 20 is correspondingly decreased resulting in a smaller potential difference across the shunting resistance 31 than across the shunting resistance 30, thus causing a current to flow in the galvanometer circuit as will be indicated by deflection of the galvanometer 32. This unbalanced condition will exist until the movable contact 33 is adjusted to such a point on resistance 30 that the potential drop across the portion of resistance 30 still in the galvanometer circuit is exactly equal to the potential drop across resistance 31 as will be indicated by galvanometer 32. Thus, the percentage of the slide wire resistance 30 which must be left in circuit to rebalance the galvanometer 32 is a direct measure of the light reaching cell 20 and is therefore similarly a measure of the transparency of the sample in vessel 18.

If the slide wire resistance 30 be calibrated in equal units such as 0 to 100, the dial reading will indicate directly the percentage of light transmitted by any sample disposed in the path of the beam illuminating cell 20. Furthermore, as it is a physical law that the color in absorption units is mathematically equal to the minus logarithm of the transparency, the slide wire dial may also be etched with a second scale which will furnish a direct reading of color in absolute absorption units.

The discussion which immediately follows shows how the above described principles are employed in the practical application of this invention in the measurement and analysis of color. As a first step in making such measurements, it is necessary to balance the output of the cells against each other so that they will both give equal responses, that is, to compensate for the differences in the photo-electric response of the two cells. The necessity for such compensation is illustrated by Fig. 7 which is a graph showing the current outputs of two typical light-sensitive cells of the current-generative type when illuminated by light of equal intensities. It will be noted that the response of cell No. 1 is about 25 per cent greater than that of cell No. 2 when both are equally illuminated. However, if, by adjustment of the relative position of the lenses 6 and 7, the intensity of the beam impinging on cell No. 2 be made 25 per cent greater than that impinging on cell No. 1, the outputs of both cells will be made equal, and, after such adjustment has been made, both cells can thereafter be regarded as being of identical sensitivity. This initial balancing should be carried out with both absorption vessels 17 and 18 containing the same material. In addition, it is necessary that light of identical wave length should reach both cells. The push-button 34 is then depressed, and either the lens holder 8 or 9 is moved until the galvanometer 32 balances at zero. During this adjustment, the slide wire dial 40 should be set at 100, the position in which the full amount of the resistance 30 is in the galvanometer circuit. Once the apparatus has been optically balanced as described, the color of any number of samples may be determined without further adjustment of the instrument. However, it is desirable, as a precautionary measure, to check the optical balance before each group of determinations.

In vessel 18 is then placed the sample whose color it is desired to measure. When the galvanometer circuit contacts 34a and the illumination circuit contacts 34b are closed by push button 34, the galvanometer 32 will deflect, due to the fact that the sample in front of cell 20 has reduced the amount of light reaching cell 20 and, therefore, its response is less than that of cell 19 as heretofore described. By rotating the slide wire 30 by means of knob 39 until galvanometer 32 shows zero deflection, the color value of the sample can then be read directly from the calibrated dial 40 as observed through opening 41 in panel 45.

In analyzing the composition of the color of any particular sample, readings are obtained in a manner similar to that described above but at various wave lengths of the visible spectrum by consecutively disposing each of a series of monochromatic color filter of different wave lengths in the paths of the light beams. In actual operations, this is accomplished by adjusting the filter disc 14 at some particular wave length, depressing the push button 34, and rotating the slide wire knob 39 until the galvanometer 32 is balanced. The reading is then taken from the dial 40, the filter disc 14 is rotated to the next filter, and the procedure repeated. In this way, transmission or absorption values may be obtained at any or all desired wave lengths in the visible spectrum thus giving values for plotting color composition curves.

For our particular purpose, we have found that either color measurement at a single wave length, provided by a filter which modifies the response of the cells employed to a sensitivity similar to that of the human eye; or a trichromatic analysis of a product with the use of three filters individually covering the red, green, and blue portions of the spectrum; or a complete color analysis in which eight or more monochromatic color filters may be employed at regular wave length intervals in the visible spectrum gives the desired information regarding the color of any given sample. However, any number of filters may be employed as, for example, by the use of infra-red or ultraviolet filters, measurements may also be extended into such portions of the spectrum.

The following tabulation, wherein a series of actual transmission measurements made by a rotating sector photometer is compared with corresponding transmission measurements made by the present invention, illustrates the extreme accuracy obtainable by means of the combination as disclosed:

| Sample | Measured transmission— | |
|---|---|---|
| | By rotating sector photometer | By instrument emboydying present invention |
| | *Percent* | *Percent* |
| 1 | 100.0 | 100.0 |
| 2 | 90.0 | 90.0 |
| 3 | 59.5 | 59.4 |
| 4 | 29.0 | 29.1 |
| 5 | 15.9 | 15.9 |
| 6 | 0.0 | 0.0 |

By the term light-sensitive devices or cells of the current-generative type, or photo-generative cells, as used in the foregoing description, we refer particularly to any photo-sensitive device which will generate a current substantially proportional to the amount of radiant energy which it receives, without the application of electrical energy from an outside source. The most common of such light-sensitive cells of the current-generative type consist of a light permeable layer of copper oxide formed on copper. A more or less typical example of such a device is the "Weston Photronic Cell."

The characteristics employed in the application of any such photo-generative cells are very different than those encountered in the application of either the photo-emissive cell (such as the potassium hydride photo-electric cell) or the photo-conductive cell (such as the selenium cell). In cells of either the photo-emissive or the photo-conductive type, an outside source of potential must be applied, and in both of such cells, it is the property of conductance which is substantially proportional to the radiant energy received, and a compensating arrangement of such cells may therefore be achieved by a simple Wheatstone bridge circuit. In the photo-generative cells, however, it is generated current rather than conductance which is proportional to the radiant energy, and a circuit similar to that disclosed by the present specifications rather than a Wheatstone bridge is necessary to achieve a perfectly balanced compensation in an arrangement employing two photo-generative cells.

While consideration might be given to appropriately varying the relative magnitude of the resistances shunting the two light-sensitive devices in order to compensate for inequalities in the photo-electric response of such cells, such an electrical method of compensation introduces a possible error which is not encountered with the present invention wherein the required compensation is attained by purely optical means and the shunt resistances are maintained invariable and substantially equal. The error introduced by varying the shunt resistances is due to the fact that the current output of a photo-generative cell is a function of the total resistance in series with the cell as illustrated by the graph designated as Fig. 8. Therefore, varying such resistances will cause a lack of stability in the calibration of such an instrument if dependence be placed on such means of electrical compensation.

In view of such facts, the combination of two light-sensitive cells of the current-generative type in the circuit as disclosed in these specifications should not be confused with devices in which photo-electric cells or circuits of a different type are employed.

From the foregoing description, it is readily apparent that our invention will provide a means for simply, accurately, and rapidly measuring or analyzing the color of any light transmitting agent. Among the numerous advantages of the apparatus described, it should be noted that the instrument operates independently of variations in intensity of the light source, employs a novel means of optically compensating for differences in response or sensitivity of light-sensitive cells of the current generative type, thus eliminating the necessity of using electrical means with a resulting change in instrument calibration, and provides a direct measure for analysis of color without factorial or empirical correction. It will also be noted that the photo-electrical color measuring device disclosed herein uses none of the standardized electrical indicating instruments often employed in color measuring devices based on photoelectric principles. By dispensing with such indicating instruments, a prevalent source of error in photo-electric photometry has been eliminated.

We wish to point out in particular that by combination of the various elements described and by suitable arrangement of said elements with respect to each other, we have produced a new and novel apparatus capable of photo-electrically measuring the color or composition of color of a given sample. The method of operating this apparatus is of such simplicity that no previous knowledge or experience is required and untrained persons, after brief instructions, can accurately make color determinations or color analyses with this instrument.

While our invention has been particularly described in connection with the color measurement of liquids, it is susceptible of embodiment in numerous variations and adaptations. For example, the light transmission of translucent and transparent solids at various wave lengths may be measured. Likewise, the color of certain gases may be determined.

This instrument is particularly adaptable to the analysis of the color of liquids such as sugar solutions, lubricating oils, vegetable oils, and the like, and of solids such as glass, paper, film, and the like.

If particular applications do not require complete analyses of visible color, a single selective filter may be employed which will modify the response of the light-sensitive cells to conform to that of the human eye. This offers the opportunity of changing an industrial color system from visual observation to photo-electric observation without rendering previous records obsolete.

Also direct transmission measurements may be made without the use of any filter.

With some modification, this invention can also be made suitable for reflection measurements as well as transmission measurements.

Other applications of this invention will be readily apparent to those skilled in the art.

The foregoing description does not by any means cover the possible uses of our invention nor the forms which it may assume, but serves to illustrate its fundamental principles and an assembly in which the novel features as disclosed above have been incorporated. It is obvious that changes in the details may be made without departing from either its novel characteristics or the spirit and scope of our invention as defined in the appended claims.

Having now described our invention, what we claim as new and desire to secure by Letters Patent is as follows:

1. A photo-electric color measuring device comprising, a single source of illumination equipped with means for projecting two separate beams of light, lenses movably mounted along the axes of said light beams for proportioning the relative intensities of said light beams, two photo-generative cells for the reception of said transmitted beams, receptacles disposed in the paths of said light beams for containing the material under test and the comparison standard, an apertured housing for protecting said cells from extraneous light, fixed resistances shunting each of said cells, a null-point instrument for indicating a condition of balance in said circuit, and means for determining the potential drop across one of said shunts in terms of the potential drop across the other of said shunts in such a manner as to provide a direct measure of the color of the material being tested.

2. A photo-electric color measuring device comprising, a single source of illumination equipped with means for projecting two separate beams of light, lenses movably mounted along the axes of said beams for proportioning the relative intensities of said light beams, two photo-generative cells for the reception of said transmitted light beams, receptacles disposed in the path of said light beams for containing the material under test and the comparison standard, a spectral filter placed in the paths of both of said light beams having such characteristics as to modify the response of said cells to that of the human eye, an apertured housing for protecting said cells from extraneous light, fixed resistances shunting each of said cells, and means for determining the potential drop across one of said shunts in terms of the potential drop across the other of said shunts in such a manner as to provide a direct measure of the color of the material being tested.

3. A photo-electric color measuring device comprising, a single source of illumination equipped with means for projecting two separate beams of light, lenses movably mounted along the axes of said beams for proportioning the relative intensities of said light beams, a photo-generative cell positioned in the path of each of said light beams, each cell being shunted by a fixed resistance, said resistances being substantially equal, means for holding a test sample in the path of one of said light beams and a comparison standard in the path of the other of said light beams, a spectral filter placed in the paths of said light beams having such characteristics as to modify the response of said cells to that of the human eye, and means for determining the potential drop across one of said shunts in terms of the potential drop across the other of said shunts thereby obtaining a direct measure of the percentage light transmission of the test sample with respect to that of the comparison standard.

4. A photo-electric color measuring device comprising a single source of illumination equipped with means for projecting two separate beams of light, lenses movably mounted along the axes of said light beams for proportioning the relative intensities of said light beams, a photo-generative cell disposed in the path of each of said transmitted beams, an apertured plate disposed in front of each of said cells, receptacles disposed in the paths of said light beams for containing the material under test and the comparison standard, a spectral filter placed in the paths of both of said light beams having such characteristics as to modify the response of said cells to that of the human eye, fixed resistances shunting each of said cells, and means for determining the potential drop across one of said shunts in terms of the potential drop across the other of said shunts in such a manner as to provide a direct measure of the color of the material being tested.

5. A photo-electric color analyzing device comprising, a single source of illumination equipped with means for projecting two separate beams of light, lenses movably mounted along the axes of said beams for proportioning the relative intensities of said light beams, duplicate series of monochromatic color filters disposed on a supporting member in such a manner that said light beams are transmitted through filters of identical characteristics, means for holding a test sample in the path of one of said light beams, and a comparison standard in the path of the other of said light beams, a photo-generative cell positioned in the path of each of said light beams, each cell being shunted by a fixed resistance, said resistances being substantially equal, and means for determining the potential drop across one of said shunts in terms of the potential drop across the other of said shunts, said measuring means together with said spectral filters providing a direct analysis of the character of color of the material being tested.

6. A photo-electric color measuring device comprising, a single source of illumination equipped with means for projecting two separate beams of light onto photo-generative cells, lenses movably mounted along the axes of said beams for proportioning the relative intensities of said light beams to such ratio as may be required to effect equal outputs of energy from said photo-generative cells, means of effecting a vernier movement of each of said lenses, a rotatably mounted color filter disc provided with duplicate sets of monochromatic color filters which transmit light of different spectral wave lengths, said filters being so positioned in said color filter disc that filters of identical characteristics are always aligned with said light beams, means for supporting a predetermined standard in the path of one of said beams and the material to be tested in the path of the other of said beams, a photo-generative cell positioned in the path of each of said light beams, each of said cells being shunted by a fixed resistance, the two fixed resistances being substantially equal, and means of determining the potential drop across one of said shunts in terms of the potential drop across the other of said shunts in such a manner as to provide a direct measure of the color of the material being tested.

7. In a photo-electric color analyzer, means of modifying separate light beams to cause to be projected onto two photo-generative cells a succession of wave length bands throughout the spectrum, said means comprising, duplicate series of monochromatic color filters disposed on a supporting member in such a manner that two light beams are transmitted through filters of identical characteristics, a pivotal arrangement by means of which said filter supporting member may be rotated in a plane perpendicular to the direction of illumination, a series of cams radially disposed on said filter supporting member, an electrical contacting switch in a circuit essential to the operation of the color analyzer, said electrical contacting switch and cams and monochromatic filters being so disposed with respect to each other that said contacting switch is automatically open circuited whenever a pair of color filters are not perfectly aligned with respect to the beams which they transmit.

8. In combination in a photoelectric spectral color analyzer, means for controlling the spectral character of separate light beams impinging on two photo-generative cells, said means comprising, a series of substantially monochromatic spectral filters, said filters with respect to the wave length of light which they transmit being consecutively disposed in a circular arrangement on a rotatable supporting member, a duplicate series of monochromatic spectral filters mounted on said rotatable supporting member identical with the first series and so disposed with respect to the individual filters of the first series that the two light beams are always projected through filters of identical characteristics, and a pivotal arrangement whereby the supporting member may be rotated in a plane perpendicular to the direction of illumination, substantially as set forth.

ALFRED L. HOLVEN.
THOMAS R. GILLETT.